United States Patent
Lee et al.

(10) Patent No.: US 8,761,292 B1
(45) Date of Patent: Jun. 24, 2014

(54) BEAMFORMING WITH STEERING SUBMATRIX SELECTION

(75) Inventors: Ying-Cheng Lee, Sunnyvale, CA (US); Timothy J. Donovan, Livermore, CA (US); Ken Kinwah Ho, San Jose, CA (US); Hongyuan Zhang, Fremont, CA (US)

(73) Assignee: Marvell International Ltd. (BM)

( * ) Notice: Subject to any disclaimer, the term of this patent is extended or adjusted under 35 U.S.C. 154(b) by 255 days.

(21) Appl. No.: 13/286,427

(22) Filed: Nov. 1, 2011

Related U.S. Application Data

(60) Provisional application No. 61/409,864, filed on Nov. 3, 2010.

(51) Int. Cl.
*H04B 7/02* (2006.01)

(52) U.S. Cl.
USPC ........................................... 375/267; 375/299

(58) Field of Classification Search
USPC .................................. 375/267, 299, 347, 349
See application file for complete search history.

(56) References Cited

U.S. PATENT DOCUMENTS

| | | | |
|---|---|---|---|
| 2006/0013250 A1* | 1/2006 | Howard et al. | 370/465 |
| 2009/0274236 A1* | 11/2009 | Mihota | 375/267 |
| 2010/0074301 A1* | 3/2010 | Howard et al. | 375/130 |
| 2012/0213181 A1* | 8/2012 | Walton et al. | 370/329 |
| 2012/0250788 A1* | 10/2012 | Walton et al. | 375/295 |
| 2012/0293370 A1* | 11/2012 | Su et al. | 342/373 |
| 2013/0154881 A1* | 6/2013 | Nabar et al. | 342/373 |

* cited by examiner

*Primary Examiner* — Emmanuel Bayard

(57) ABSTRACT

Systems, methods, and other embodiments associated with beamforming with steering submatrix selection are described. According to one embodiment, an apparatus includes a steering matrix cache unit configured to store a steering matrix. The apparatus also includes a read control unit configured to select a steering submatrix from the steering matrix based, at least in part, on packet transmission instructions associated with a packet being processed for transmission. The read control unit is also configured to provide weights from the selected steering submatrix to a transmitter transmitting the packet.

20 Claims, 5 Drawing Sheets

BEAMFORMING WITH STEERING SUBMATRIX SELECTION

CROSS REFERENCE TO RELATED APPLICATIONS

This patent disclosure claims the benefit of U.S. Provisional Application No. 61/409,864 filed on Nov. 3, 2010, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Multiple Input Multiple Output (MIMO) systems generally leverage aspects of intersymbol interference to potentially increase the bandwidth efficiency of existing spectra. In wireless communication, radio waves may not propagate in a straight line between a transmitter and a receiver, e.g., radio waves can bounce and scatter randomly off objects in the environment. This scattering, known as multipath, results in multiple copies of a transmitted signal arriving at a receiver via different scatter paths. MIMO leverages multipath to enhance transmission accuracy and allow multiple signals to be broadcast at the same frequency. This is done by treating the multiple scatter paths as separate parallel sub channels, each capable of bearing distinct data.

MIMO operates by splitting a discrete outbound signal into multiple parallel substreams using an array of transmitter antennas to simultaneously launch (or transmit) the parallel substreams. Another array of antennas in the receiving device is used to pick up (or receive) the multiple transmitted spatial streams and their scattered signals. Each receive antenna picks up all of the incident transmitted spatial streams superimposed as observed components of the received signal vector, not separately. However, the multiple spatial streams are all scattered slightly differently, since the multiple spatial streams originate from different transmit antennas located at different points in space. These scattering differences allow the spatial streams to be identified and recovered from the observed components of the received signal vector.

Beamforming significantly improves the performance of MIMO by spatially separating the transmitted data streams. With transmit beamforming, weights are applied to the signal transmitted by each transmit antenna to "steer" the composite transmission toward the intended receiver. The weights for each transmit antenna for each spatial stream, typically expressed as a steering matrix, are derived from channel state information (CSI) for each spatial stream. The CSI describes the channel travelled by a given spatial stream between the transmit antenna array and the receiver. The CSI is used to derive the weights for the signal from each transmitter antenna that will cause the composite signal to travel back along the channel to the intended receiver.

Orthogonal Frequency Division Multiplexing (OFDM) divides a communications channel into a number of equally spaced frequency bands, called tones. A subcarrier carrying a portion of the user information is transmitted in each tone. In OFDM, each tone is orthogonal (independent) to every other tone. OFDM spread spectrum distributes the data over a large number of tones that are spaced apart at precise frequencies. In OFDM, the original data is split into parallel streams and each stream is mapped to a different tone. The tones are combined using the inverse fast Fourier transform (IFFT) to yield a time-domain waveform packet to be transmitted. In a multiple-access system, groups of tones can be assigned to different users. Multiple users can thus share the same overall bandwidth. The typical frequency channel for legacy wireless communication systems is 20 MHz. IEEE 802.11n specifies a 40 Mhz channel, having 20 MHz upper and lower bands. Other systems can employ channels having other bandwidths, e.g., 80 MHz channel, 120 MHz channel, 160 MHz channel, and so on.

In the case of multiple-access MIMO-OFDM, different weights may be applied to selected tones in the transmitted packet so the tones are steered along a channel between the transmitter and a wireless device assigned to the tones. Meanwhile other tones in the packet may be weighted differently so that the tones are steered to the wireless devices to which the tones are assigned. MIMO in combination with OFDM constitutes the basis for many wireless communication standards, such as IEEE802.11n.

SUMMARY

In one embodiment an apparatus includes a steering matrix cache unit configured to store a steering matrix. The apparatus also includes a read control unit configured to select a steering submatrix from the steering matrix based, at least in part, on packet transmission instructions associated with a packet being processed for transmission. The read control unit is also configured to provide weights from the selected steering submatrix to a transmitter transmitting the packet.

In another embodiment, a method include receiving transmission instructions specifying one or more transmission parameters for transmission of a packet; selecting a steering submatrix from a stored steering matrix based, at least in part, on the transmission parameters; and providing weights from the selected steering submatrix to a transmitter transmitting the packet for beamforming of the packet.

In another embodiment, a device includes a media access control unit configured to provide transmission instructions specifying parameters for transmission of a packet. The device includes a baseband unit including a steering matrix cache unit configured to store a steering matrix. The baseband unit also includes a read control unit configured to select a steering submatrix from the steering matrix based, at least in part, on the packet transmission instructions. The baseband unit also includes a transmitter configured to i) receive the steering submatrix from the read control unit and ii) weight data in the packet according to weights in the selected steering submatrix for transmit beamforming of the packet.

BRIEF DESCRIPTION OF THE DRAWINGS

The accompanying drawings, which are incorporated in and constitute a part of the specification, illustrate various systems, methods, and other embodiments of the disclosure. The element boundaries (e.g., boxes, groups of boxes, or other shapes) shown in the figures represent one example of the boundaries. In some examples one element may be implemented as multiple elements or multiple elements may be implemented as one element. In some examples, an element shown as an internal component of another element may be implemented as an external component and vice versa.

DETAILED DESCRIPTION

Described herein are example systems, methods, and other embodiments associated with beamforming with steering submatrix selection. Beamforming with steering submatrix selection allows a selected portion of a steering matrix (e.g., a steering submatrix) to be applied to a packet that is being transmitted using less than the full range of transmission parameters that are encoded in the steering matrix. Thus, a new steering matrix does not need to be derived if the packet transmission instructions specify a subset of the transmission parameters encoded in the steering matrix, resulting in faster steering of beamformed transmissions.

For example, a steering matrix may be stored for transmit beamforming of packets to a given wireless device that includes weights corresponding to tones in a 40 MHz channel. Transmission instructions for a packet to the wireless device may specify a 20 MHz channel. Beamforming with steering submatrix selection provides weights from the steering submatrix selected from the steering matrix that corresponds to the 20 MHz bandwidth within the 40 MHz channel to be applied to the packet without re-sounding or re-calculating a steering matrix for the 20 MHz bandwidth.

Likewise, a steering matrix may be stored for transmit beamforming of packets to a given wireless device that includes weights corresponding to three space-time-streams. Transmission instructions for a packet to the wireless device may specify two space-time streams. Beamforming with steering submatrix selection provides weights from the steering submatrix corresponding to the two space-time-streams to be applied to the packet without re-sounding or re-calculating a steering matrix for the two space-time-streams.

Figure 1:
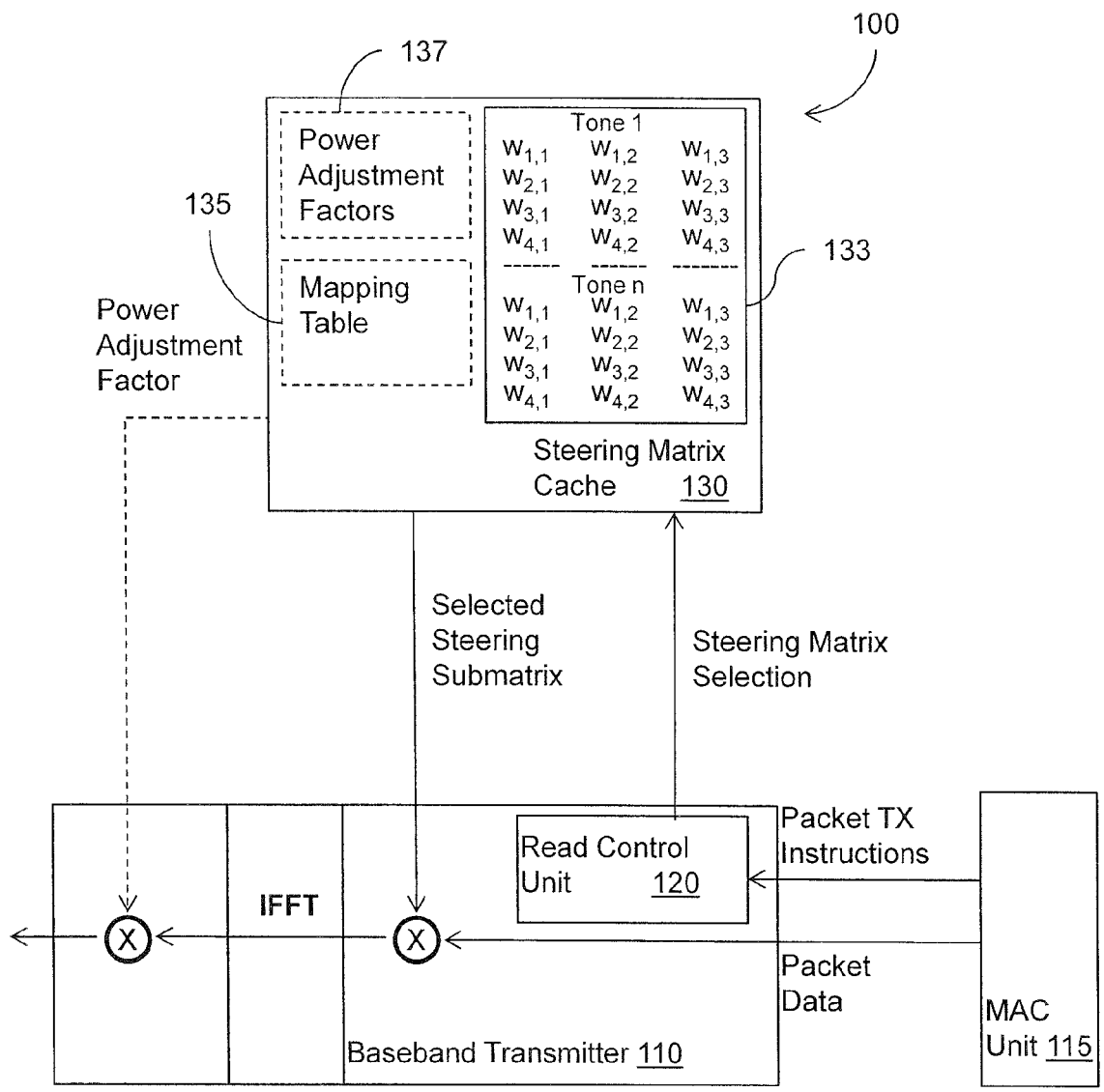
FIG. 1 illustrates one embodiment of an apparatus associated with beamforming with steering submatrix selection.

With reference to FIG. 1, one embodiment of beamforming apparatus 100 that performs steering submatrix selection is shown. The beamforming apparatus 100 includes a baseband transmitter 110 that receives a packet for transmitting from a Media Access Control (MAC) Unit 115. The baseband transmitter 110 is performing beamforming on transmitted packets, meaning that the transmitter is applying weights from a steering matrix to the packet data in the frequency domain so that the data is steered through the channel described in the steering matrix. The MAC Unit 115 provides packet data to be transmitted as the payload of the packet to the baseband transmitter 110. The MAC Unit 115 also provides transmission instructions that specify transmission parameters describing how the packet is to be transmitted.

One transmission parameter is a bandwidth of the channel to be used for transmitting the packet. There are several standard channel bandwidths: 20 MHz, 40 MHz, 80 MHz, and 160 MHz. IEEE 802.11n supports a 40 MHz bandwidth, which may be divided into an upper 20 MHz band and a lower 20 MHz band. Most early wireless standards support a 20 MHz bandwidth while modern devices are moving to a 40 or 80 MHz bandwidth. Depending on various conditions at transmission time, the MAC Unit 115 may specify a certain bandwidth (e.g., upper 20 MHz, lower 20 MHz, or 40 MHz) to be used for packet transmission. Another transmission parameter is a number of space-time-streams on which to transmit the packet. Modern MIMO transmitters are typically capable of transmitting up to 8 space-time-streams. However, the MAC Unit 115 may specify a lower number of space-time-streams for a given packet.

The baseband transmitter 110 includes a read control unit 120 that receives the transmission instructions from the MAC unit 115. The read control unit 120 accesses a steering matrix cache unit 130 to retrieve a steering submatrix that corresponds to the transmission instructions. The steering matrix cache unit 130 stores a steering matrix 133 that records weights to be applied to various portions of the packet data by the different transmit antennas (not shown) when transmitting to a given wireless device. The steering matrix 133 stores weights that are applied by the baseband transmitter 110 to spatially spread the transmitted data across the antennas. Thus, if the baseband transmitter 110 has 4 transmit antennas, and there are 3 data streams, for each tone in the bandwidth, steering matrix includes (4 transmit antennas×3 streams=)12 weights.

When Orthogonal Frequency Division Modulation (OFDM) is being used to encode the packet data, the steering matrix may store different weights for different tones (frequency bands within the overall bandwidth). In the steering matrix 133 there are n sets of rows, each set of rows corresponding to a different tone within the full bandwidth. Each row in the set of rows corresponds to a different transmit antenna. For example, if the full bandwidth is 40 MHz with 58 different tones and there are 4 transmit antennas, the steering matrix 133 would have 58 sets of 4 rows.

The steering matrix may also store weights to be applied to portions of the packet data to separate the packet data into different space-time-streams. The steering matrix 133 stores weights for each space-time-stream by column, thus, the steering matrix 133 stores weights for three space-time streams. To determine a weight to be applied to a specific tone in a packet that is to be transmitted on a given space-time-stream, the baseband transmitter 110 selects a corresponding weight from the steering matrix. For example, the weights for packet data in the first tone that is to be transmitted on the second space-time-stream are the weights $w_{1,2}, w_{2,2}, w_{3,2}, w_{4,2}$ in the Tone 1 section of the matrix.

The steering matrix 133 is stored in the steering matrix cache unit 130 prior to the transmission of the packet by the baseband transmitter. The steering matrix may include weights for the full bandwidth and a maximal number of space-time-streams supported by the baseband transmitter 110. While the steering matrix 133 includes tones mapped to rows and space-time-streams mapped to columns, other methods of mapping weights in the steering matrix may be employed. A brief summary of how the steering matrix 133 may be derived follows.

Calculating the steering matrix depends on having channel state information (CSI). Therefore, the channel needs to be sounded between two devices to measure the CSI. During sounding, device A transmits a packet to device B. Device B estimates the CSI from Long Training Frame(s) (LTF) in the packet. One difficulty is that a poor channel between the devices may only support a single spatial stream prior to transmit beamforming, but the channel may support many spatial data streams with transmit beamforming. In a normal packet, the preamble contains one LTF for each spatial stream. Thus, if device A transmits a single stream packet to device B, the packet will only have one LTF. The full dimensionality of the channel is equivalent to the number of transmit antennas at device A and the number of receive antennas at device B. With only one LTF, the CSI for only one spatial stream can be estimated. This limitation is addressed in wireless communication standard IEEE 802.11n.

IEEE 802.11n specifies the manner in which the CSI is communicated between devices. There are two approaches to channel sounding in the 802.11n standard, sounding using a null packet and sounding by way of Extension LTFs. The number of LTFs in the null packet preamble is selected to cover the full dimensionality of the channel. This type of packet contains no data, therefore there is no issue with a poor channel. In Extension LTF, the packet includes data, however, extra LTFs are included in the preamble beyond those necessary for channel estimation of the data. The extra LTFs can be used to measure the full dimensionality of the channel (e.g., derive the CSI for each spatial stream).

Once the channel is sounded, channel information is fed back to the device that will be applying the steering matrix to beamform transmissions. 802.11n specifies two methods of feeding back the channel information: implicit feedback and explicit feedback. Implicit feedback is based on an assumption of reciprocity of the channel in both directions. Therefore, the CSI measured at either end of the channel is considered to be equivalent at the other end. The exchange of feedback and beamforming with implicit feedback per 802.11n is performed as follows. A device B sends a sounding packet (either a null packet or an extended LTF packet) to device A. Device A estimates the CSI from the LTFs in the sounding packet. Device A computes the steering matrix from the estimated CSI.

With explicit feedback, the device performing the transmit beamforming is the same device as the device that transmits the sounding packet. Device A transmits a sounding packet to device B. Device B estimates the CSI from the LTFs in the packet. Then device B transmits the estimated CSI or, in some cases, a steering matrix, to device A. Any suitable method may be used to derive the steering matrix 133 that is stored in the steering matrix cache unit 130.

As just discussed, the steering matrix 133 may include weights for the full bandwidth and maximal number of space-time-streams. However, the transmission instructions may specify that the packet is to be transmitted using less than the full bandwidth and/or less than the maximal number of space-time-streams. The read control unit 120 selects a steering submatrix from the steering matrix 133 that corresponds to the transmission parameters in the transmission instructions. Weights from the selected submatrix are provided to the baseband transmitter 110 to be applied to the packet data.

In order to select the appropriate submatrix, the read control unit 120 may access mapping information 135 that describes how the weights are stored in the steering matrix. For example, the mapping information may describe which rows store weights for tones in the lower 20 MHz band of a steering matrix that stores weights for the entire 40 MHz bandwidth. The mapping information may describe which columns store weights for transmissions that occur on two of the three space-time-streams.

In some embodiments, the steering matrix cache unit 130 stores power adjustment factors 137. The power adjustment factors are used to normalize the power with which the baseband transmitter 110 transmits when using less than the full bandwidth. A power adjustment factor is stored for each possible bandwidth (e.g., 20 MHz lower, 20 MHz upper, 40 MHz). The read control unit 120 selects the appropriate power adjustment factor for the bandwidth specified in the transmission instructions and provides the selected power adjustment factor to the baseband transmitter 110. The baseband transmitter 110 applies the power adjustment factor to the packet data in the time domain, based on the power normalized to the ratio between the number of applied tones and the number of total tones (normalized by accumulated $w^{1/2}+\ldots w^{29/2}$ versus normalized by accumulated $w^{1/2}+\ldots+w^{58/2}$). In addition to selecting a power adjustment factor 137, the read control unit 130 may also apply a scaling factor in the frequency domain depending on the number of space-time-streams that are being used. In one embodiment, the scaling factor is the reciprocal of the square root of the number of space-time-streams being used.

Figure 2:
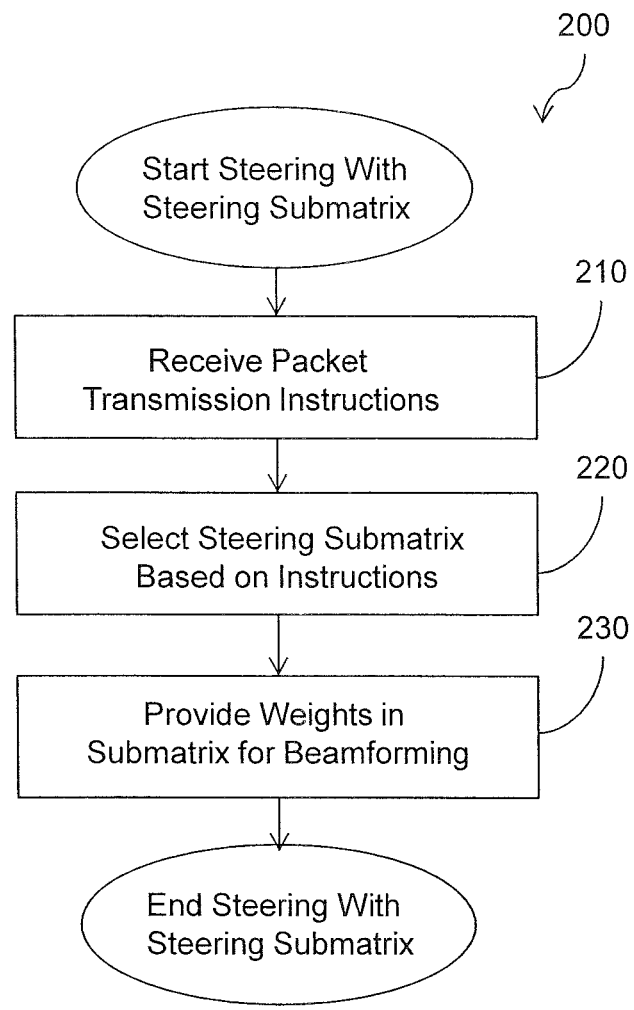
FIG. 2 illustrates one embodiment of a method associated with beamforming with steering submatrix selection.

FIG. 2 outlines a method 200 for packet steering with a steering submatrix. At 210, the method includes receiving transmission instructions specifying one or more transmission parameters for transmission of a packet. At 220, a steering submatrix is selected from a stored steering matrix based, at least in part, on the transmission parameters. At 230, the method includes providing weights from the selected steering submatrix to a transmitter transmitting the packet for beamforming of the packet. The weights may thus be provided for transmission according to a subset of the transmission parameters encoded in the steering matrix without re-sounding the channel.

The method 200 may also include receiving a sounding response packet that includes a steering matrix corresponding to a full bandwidth for a channel and a maximal number of space-time-streams. The steering matrix is stored for future processing of packets. Alternatively, the method may include receiving channel related information in a previous packet received from a device to which the packet is being transmitted. The steering matrix can be derived from the channel related information and stored for future processing of packets. The steering matrix is used in beamforming of packets that are transmitted in a transmit bandwidth less than or equal to the full bandwidth or in a number of space-time-streams less than or equal to the maximal number of space-time-streams.

Figure 3:
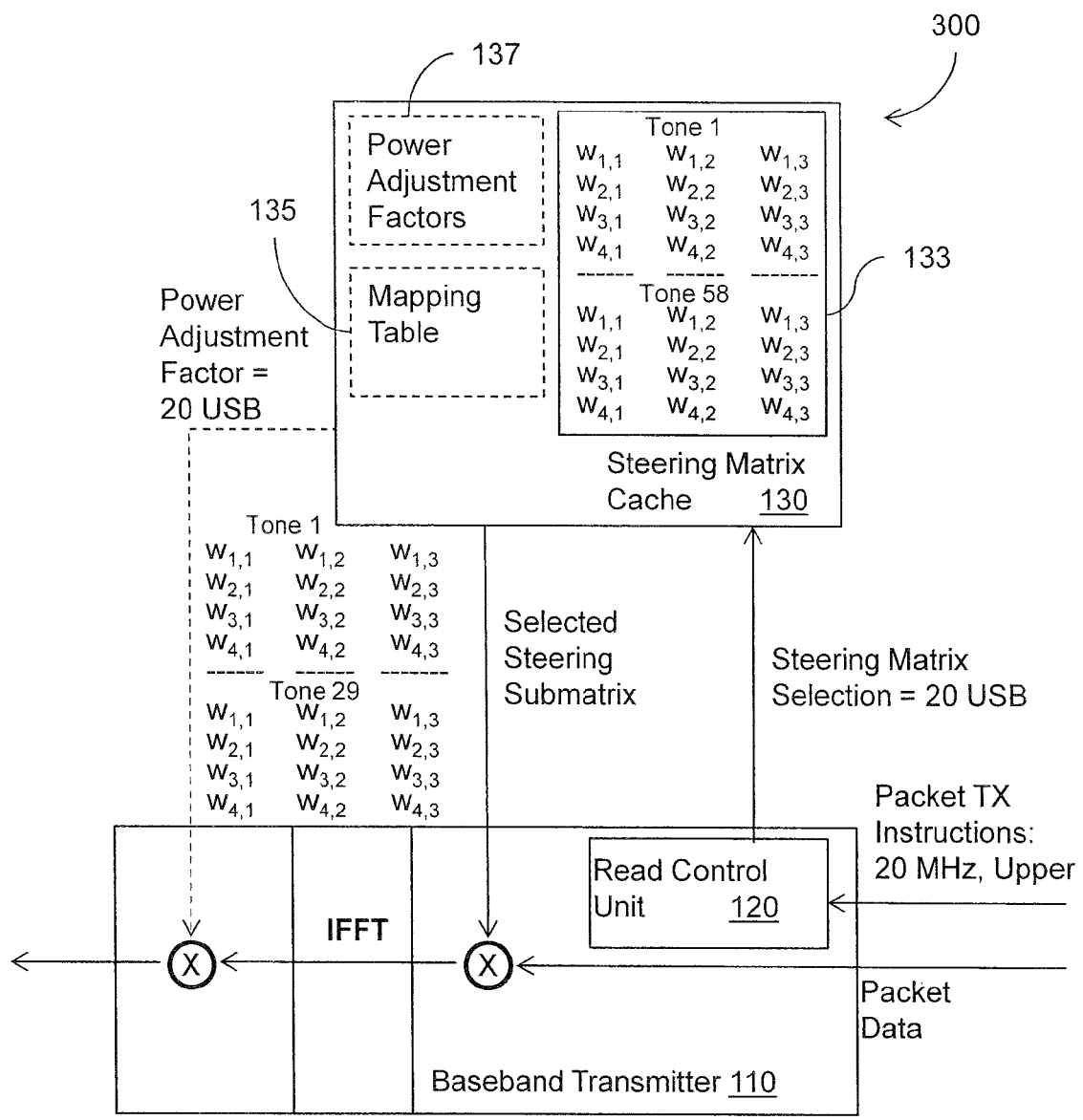
FIG. 3 illustrates one embodiment of an apparatus associated with beamforming with steering submatrix selection.

FIG. 3 illustrates one embodiment of a beamforming apparatus 300 performing steering with steering submatrix selection. The steering matrix 133 stores a steering matrix of weights for a 40 MHz full bandwidth distributed across 58 tones and three space-time-streams. The baseband transmitter 110 receives a packet for transmission to a wireless device. The transmission instructions specify that the transmit bandwidth is the upper 20 MHz band. The read control unit 120 consults the mapping table 135 and selects a steering submatrix from the steering matrix 133 that includes weights for the upper 20 MHz band. The selected steering matrix includes the first 29 rows of the steering matrix 133. The baseband transmitter 110 weights the packet data according to the weights. The read control unit 120 also selects a power adjustment factor 137 for the upper 20 MHz band.

Figure 4:
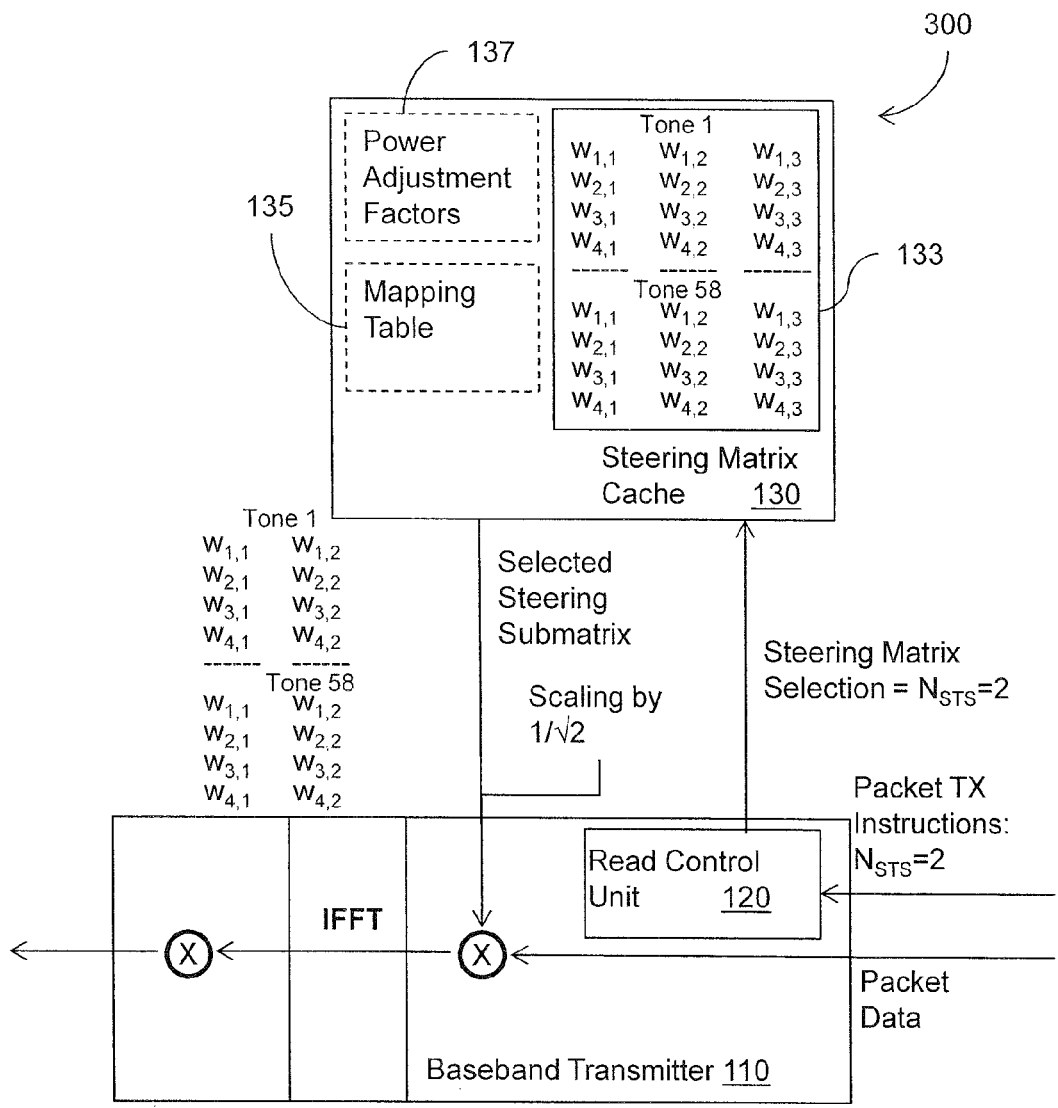
FIG. 4 illustrates one embodiment of an apparatus associated with beamforming with steering submatrix selection.

FIG. 4 illustrates one embodiment of a beamforming apparatus 400 performing steering with steering submatrix selection. The steering matrix 133 stores a steering matrix of weights for a 40 MHz full bandwidth distributed across 58 tones and three space-time-streams. The baseband transmitter 110 receives a packet for transmission to a wireless device. The transmission instructions specify that the transmission is to occur on two space-time-streams. The read control unit 120 consults the mapping table 135 and selects a steering submatrix from the steering matrix 133 that includes weights for two space-time-streams. The selected steering matrix includes the first two columns of the steering matrix 133. The baseband transmitter 110 weights the packet data according to the weights. The read control unit 120 also scales the packet data by the reciprocal of the square root of two because two space-time-streams are being used.

Figure 5:
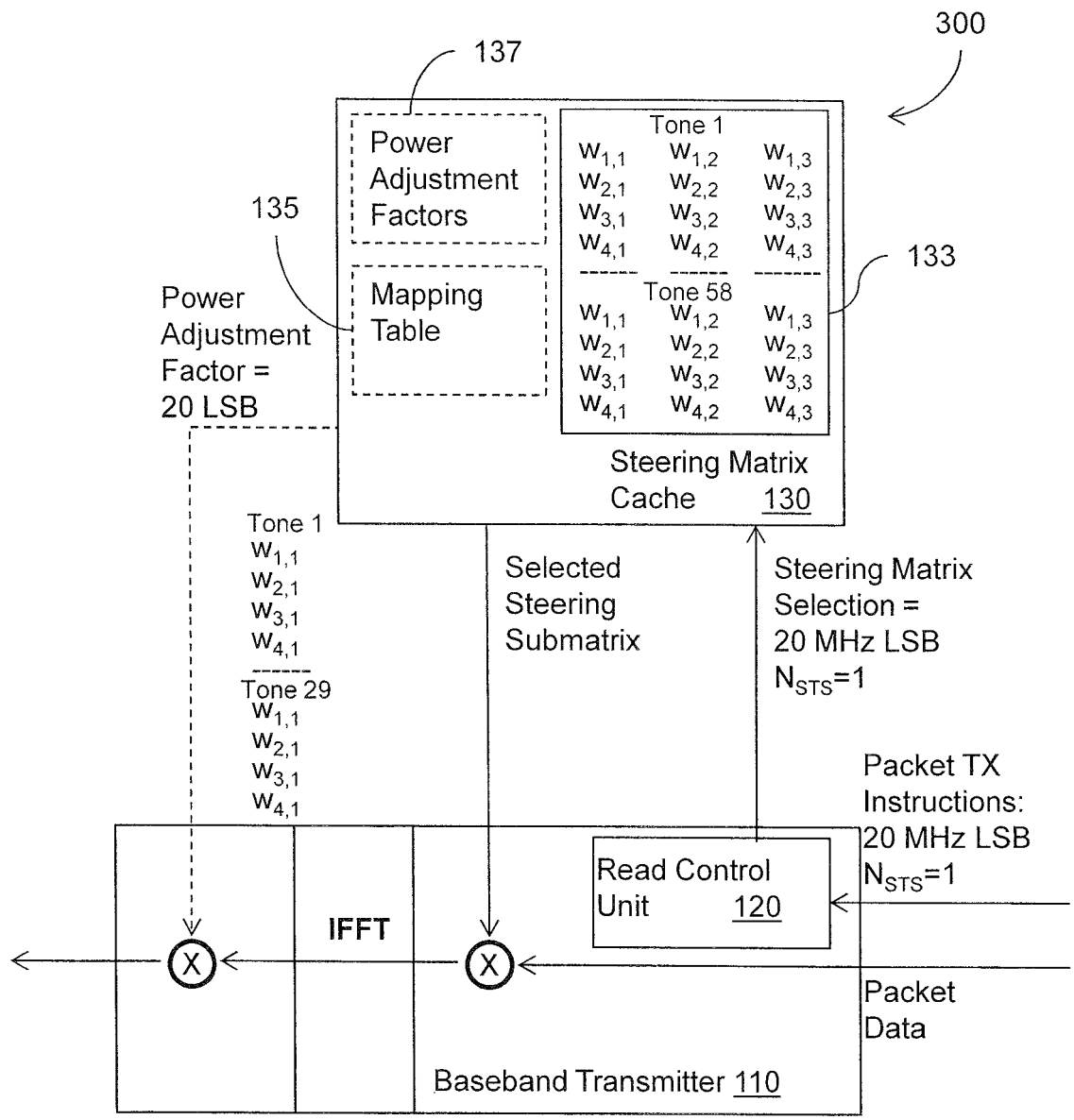
FIG. 5 illustrates one embodiment of an apparatus associated with beamforming with steering submatrix selection.

FIG. 5 illustrates one embodiment of a beamforming apparatus 300 performing steering with steering submatrix selection. The steering matrix 133 stores a steering matrix of weights for a 40 MHz full bandwidth distributed across 58 tones and three space-time-streams. The baseband transmitter 110 receives a packet for transmission to a wireless device. The transmission instructions specify that the transmit bandwidth is the lower 20 MHz band and that one space-time-stream is to be used. The read control unit 120 consults the mapping table 135 and selects a steering submatrix from the steering matrix 133 that includes weights for the lower 20 MHz band and one space-time-stream. The selected steering matrix includes the last 29 rows of the steering matrix 133 in the first column. The baseband transmitter 110 weights the packet data according to the weights. The read control unit 120 also selects a power adjustment factor 137 for the upper 20 MHz band. No scaling is necessary because a single space-time-stream is used.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, this application is intended to embrace alterations, modifications, and variations that fall within the scope of the appended claims.

What is claimed is:

1. An apparatus, comprising:
a steering matrix cache unit configured to store a steering matrix, wherein the steering matrix includes n rows and c columns; and
a read control unit configured to select rows and columns from the steering matrix based, at least in part on packet transmission instructions associated with the packet being processed for transmission, wherein the selected rows and columns correspond to a steering submatrix having less than n rows or less than c columns;
the read control unit further configured to provide weights from the steering submatrix to a transmitter transmitting the packet for transmit beamforming of the packet.

2. The apparatus of claim 1, wherein the steering matrix is derived for a full bandwidth channel.

3. The apparatus of claim 2, wherein the read control unit is configured to:
analyze the transmission instructions to determine a transmit bandwidth; and
when the transmit bandwidth is less than the full bandwidth, select rows from the steering matrix for the steering submatrix that correspond to the transmit bandwidth.

4. The apparatus of claim 3, wherein the read control unit is further configured to:
select a power adjustment factor associated with the transmit bandwidth; and
provide the power adjustment to the transmitter transmitting the packet.

5. The apparatus of claim 1 where the steering matrix is derived from an explicit steering matrix feedback packet.

6. The apparatus of claim 1 where the steering matrix is derived from an implicit steering matrix feedback packet.

7. The apparatus of claim 1, wherein the steering matrix is derived for a maximal number of space-time-streams between the transmitter and an intended receiver for the packet.

8. The apparatus of claim 7, wherein the read control unit is further configured to:
analyze the transmission instructions to determine a number of transmit space-time-streams in which to transmit the packet; and
when the number of transmit space-time-streams is less than the maximal number of space-time-streams, select a number of columns from the steering matrix for the steering submatrix that correspond to the number of transmit space-time-streams.

9. The apparatus of claim 8, wherein the read control unit is further configured to:
select a scaling factor associated with the number of transmit space-time-streams; and
provide the scaling factor to the transmitter transmitting the packet.

10. The apparatus of claim 1, wherein:
the steering matrix cache is configured to store i) weights to be applied to data transmitted by a transmit antenna in a transmit antenna array, wherein the weights are stored in the steering matrix such that weights for each tone are stored in the same row, and ii) weights for each tone in a given space-time-stream are stored in the same column; and
the read control unit selects a steering submatrix comprising i) a subset of rows corresponding to tones contained a transmit bandwidth, and ii) a subset of columns corresponding to a number of space-time-streams specified by the packet transmission instructions.

11. A method, comprising:
  receiving transmission instructions specifying one or more transmission parameters for transmission of a packet;
  selecting a steering submatrix from a stored steering matrix having n rows and c columns, wherein the selecting is based, at least in part, on the transmission parameters, further wherein the steering submatrix has less than n rows or less than c columns; and
  providing weights from the selected steering submatrix to a transmitter transmitting the packet for transmit beamforming of the packet.

12. The method of claim 11, wherein the transmission parameters include a transmit bandwidth, and the method further comprises:
  receiving a sounding response packet that includes a steering matrix corresponding to a full bandwidth for a channel; and
  storing the steering matrix for future processing of packets transmitted at a transmit bandwidth less than or equal to the full bandwidth.

13. The method of claim 12, further comprising:
  storing the steering matrix such that rows of weights correspond to tones in a frequency domain packet; and
  selecting a steering submatrix that includes rows for tones present in the transmit bandwidth.

14. The method of claim 11, wherein the transmission parameters include a number of space-time-streams, and the method further comprises:
  receiving a sounding response packet that includes a maximal number of space-time-streams for a channel; and
  storing the steering matrix for future processing of packets transmitted on a number of space time streams less than or equal to the maximal number of space-time-streams.

15. The method of claim 14, further comprising:
  storing the steering matrix such that columns of weights correspond to space-time-streams; and
  selecting a steering submatrix that includes columns for the number of space-time-streams.

16. The method of claim 11, wherein the selecting of a submatrix is performed without re-sounding a channel on which the packet is being transmitted.

17. The method of claim 11, further comprising
  receiving channel related information in a packet from a device to which the packet is being transmitted;
  deriving a steering matrix from the channel related information; and
  storing the steering matrix for future processing of packets.

18. A device comprising:
  a media access control unit configured to provide transmission instructions specifying parameters for transmission of a packet;
  a baseband unit comprising
    a steering matrix cache unit configured to store a steering matrix, and
    a read control unit configured to select rows and columns from the steering matrix based, at least in part on packet transmission instructions associated with the packet being processed for transmission, wherein the selected rows and columns correspond to a steering submatrix having less than n rows or less than c columns; and
  a transmitter configured to i) receive the steering submatrix from the read control unit and ii) weight data in the packet according to weights in the selected steering submatrix for transmit beamforming of the packet.

19. The device of claim 18, wherein:
  the steering matrix cache is configured to store:
  i) weights to be applied to data transmitted by a transmit antenna in a transmit antenna array, wherein the weights are stored in the steering matrix such that weights for each tone are stored in the same row, and
  ii) weights for each tone in a given space-time-stream are stored in the same column; and
  the read control unit is configured to select a steering submatrix comprising i) a subset of rows corresponding to tones contained a transmit bandwidth, and ii) a subset of columns corresponding to a number of space-time-streams specified by the packet transmission instructions.

20. The device of claim 18, wherein:
  the steering matrix includes weights for a full bandwidth and a maximal number of space-time-streams; and
  the read control unit is configured to analyze the transmission instructions to
    determine i) a transmit bandwidth and ii) a number of space-time streams on which to transmit the packet, and
    when the transmit bandwidth is less than a full bandwidth, select a steering submatrix that corresponds to the transmit bandwidth, and
    when the number of space-time-streams is less than the maximal number, select a steering submatrix that corresponds to the number of space-time-streams.

* * * * *